Figure 5:
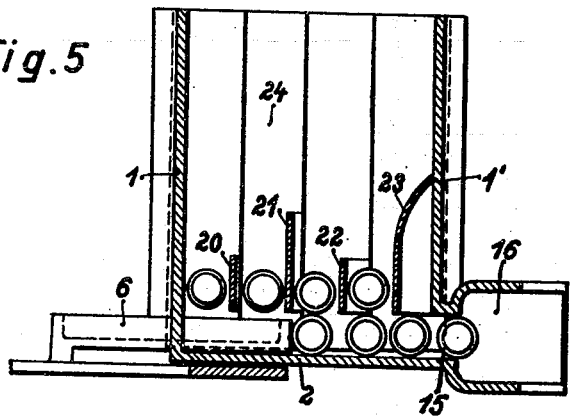

Dec. 30, 1930. V. HOLEK 1,786,537
APPARATUS FOR FILLING MAGAZINES FOR SELF LOADING FIREARMS
Filed July 11, 1929  3 Sheets-Sheet 1

Fig.1

Fig.2.

VÁCLAV HOLEK
INVENTOR

BY Otto Munk
his ATTORNEY

Dec. 30, 1930.   V. HOLEK   1,786,537
APPARATUS FOR FILLING MAGAZINES FOR SELF LOADING FIREARMS
Filed July 11, 1929   3 Sheets-Sheet 2
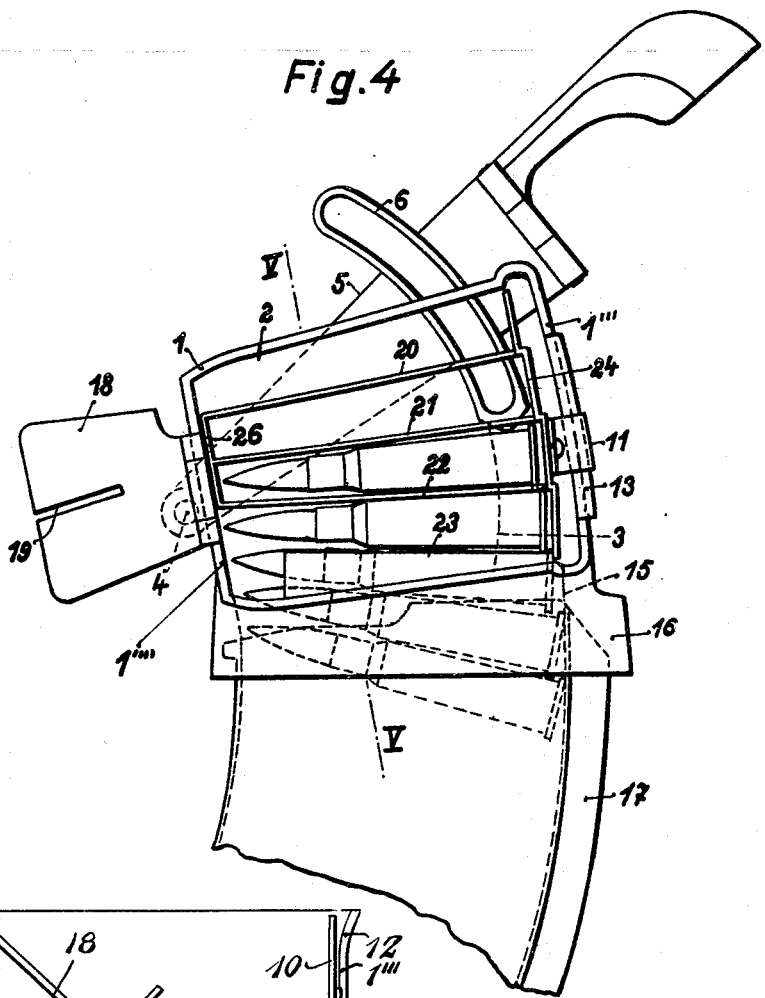
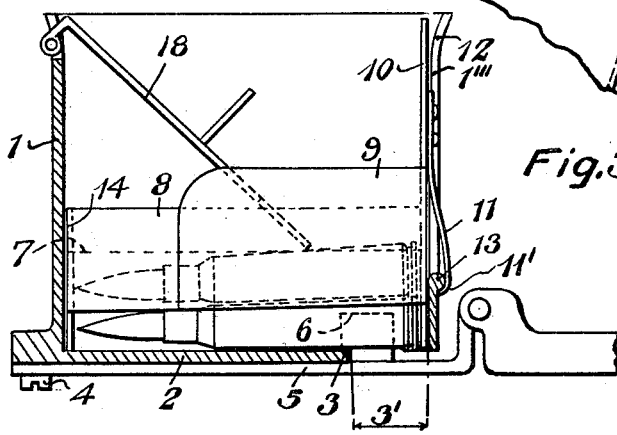
VÁCLAV HOLEK
INVENTOR
BY
his ATTORNEY Dec. 30, 1930.  V. HOLEK  1,786,537
APPARATUS FOR FILLING MAGAZINES FOR SELF LOADING FIREARMS
Filed July 11, 1929  3 Sheets-Sheet 3

VÁCLAV HOLEK
INVENTOR
BY
ATTORNEY

Patented Dec. 30, 1930

1,786,537

UNITED STATES PATENT OFFICE

VÁCLAV HOLEK, OF BRUNN, CZECHOSLOVAKIA, ASSIGNOR TO THE FIRM CESKOSLOVENSKA ZBROJOVKA AKCIOVA SPOLECNOST V BRNE, OF BRUNN, CZECHOSLOVAKIA

APPARATUS FOR FILLING MAGAZINES FOR SELF-LOADING FIREARMS

Application filed July 11, 1929, Serial No. 377,523, and in Czechoslovakia October 15, 1928.

The object of the present invention is to accelerate the filling of empty magazines with loose cartridges by hand as much as possible and to provide an apparatus which is of simple construction and easy to manipulate which will permit empty magazines of self-loading fire arms to be filled with loose cartridges in the shortest possible time. According to the present invention the apparatus consists of a receptacle for holding the cartridges, an opening in one of the side walls of the receptacle and above the bottom thereof for the passage therethrough of a cartridge, a feeder adapted to be moved to and from this side opening and of means in the receptacle adapted to pile loose cartridges introduced into the receptacle in rows of superposed cartridges in such a way that on the movement of the feeder towards the side opening the cartridges of the lowermost row are transferred in succession through the side opening into a magazine communicating with this latter.

Two constructions embodying the apparatus for filling magazines according to the present invention are shown in the drawings, being constructions in which loose cartridges are transferred to the magazine.

Figs. 1 to 3 show a constructional form of the apparatus for cartridges which have no projecting flange. Fig. 1 shows the apparatus in plan. Fig. 2 is a section through the apparatus on the line II—II of Fig. 1, the feeder being in the initial position. Fig. 3 is a longitudinal section through the apparatus.

Figure 6:
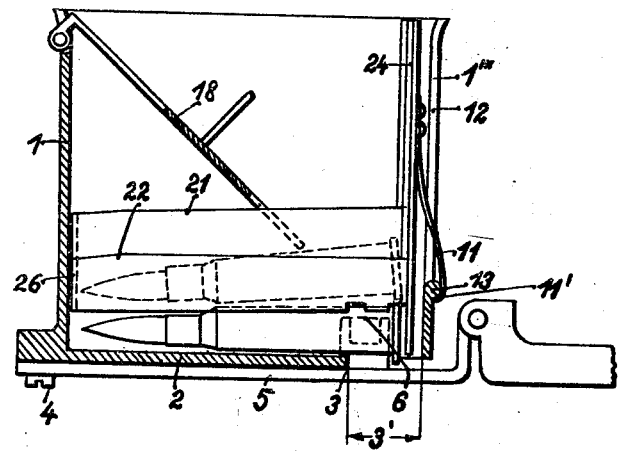

Figs. 4 to 6 show a second constructional example of the apparatus according to the invention, intended for use with cartridges which have a projecting flange. Fig. 4 is a plan of the apparatus, Fig. 5 shows it in cross section on the line V—V of Fig. 4 and Fig. 6 shows the apparatus in longitudinal section.

In the constructional example shown in Figs. 1 to 3 the apparatus consists of a receptacle 1 for holding loose cartridges. The bottom 2 of this receptacle 1 has in it an opening 3', the edge 3 of which is curved. This opening 3' is situated, as particularly shown in Figs. 1 to 3, at the side of the receptacle where the bases of the cartridges introduced into the cartridge receptacle are located.

Under the bottom 2 of the receptacle is mounted a lever 5 which turns about the pin 4 and is provided with a feeder blade 6 which passes through the opening 3' in the bottom of the receptacle for the cartridges and into the interior thereof. This feeder blade 6 is made curved in shape as shown in Fig. 1 and embraces in the manner shown in Fig. 3 the curved edge 3, the centre of curvature of which lies in the point of rotation 4 of the lever.

The receptacle is in plan, as shown in Fig. 1, wider at one end than it is at the other and corresponds to the shape of the cartridges which are to be introduced into the receptacle. One side wall 1' of the receptacle has in it an opening 15, which is of such a size that a cartridge can pass unimpeded through it. The shape of this opening is suited to the shape of cartridge, that is to say this opening narrows towards one side correspondingly with the conical form of the cartridge and the projectile. In the vicinity of the opening 15 the receptacle has a projection 16, which serves for insertion of the magazine to be filled.

In the interior of the receptacle 1 are provided means for piling in rows the loose cartridges placed in the receptacle. The piling device consists in the present constructional example of partitions 7, 8 and 9 provided in the receptacle which subdivide the interior of the receptacle into chambers 30, 31, 32 running at right angles to the direction of movement of the feeder.

The transverse partitions 7, 8, 9 are mounted as explained later yieldingly as to height and are so arranged in the receptacle that normally a space 34 is left between the lower edges 7', 8', 9', and the bottom 2 of the receptacle, which is less than that required for the passage therethrough of a cartridge.

In the constructional form shown in Figs. 1 to 3 this piling device consists of a separate inserted member composed of the transverse partitions 7, 8, 9 and the connecting walls 10, 14 and is arranged interchangeably in the receptacle 1. The connecting walls 10, 14 are provided on the ends of the transverse partitions and bear against the inner surface of the side walls 1''', 1'''' of the receptacle. The parts 10, 1''', and 14, 1'''' form guides for the separate inserted member in its movements longitudinally of the receptacle.

As has been already described the partitions 7, 8, 9 are mounted so as to be variable as to height. This variable mounting is obtained in the constructional example shown by a spring 11 attached to the connecting wall 10, which passes through a slot 12 provided in the side wall 1''' of the receptacle and embraces with its hook-shaped end 11' a bead 13. As shown in Fig. 3 the spring 11 is curved whereby a certain resilience of the separate inserted member and of the ends of the partitions 7, 8, 9 is secured.

As shown in particular in Fig. 2 the transverse partitions 7, 8, 9 are of different heights and the one adjoining the outlet opening 15 is the highest, while the height of the others becomes gradually less as the distance from the outlet opening 15 increases.

Furthermore the distance of the transverse partitions from each other and from the walls of the receptacle is so calculated that room enough for at most two cartridges is left between each two partitions in planes lying parallel with the direction of movement of the feeder. In this way it is ensured that on throwing the loose cartridges into the receptacle 1 they will be so distributed in the lower part thereof that they cannot get awry and mutually obstruct each other.

To the side wall 1'''' is pivoted a flap 18 which, after the receptacle has been filled with loose cartridges from above, can be shut down over the cartridges and these latter thus prevented from being thrown out or jumping out. In order that the flap 18 may engage between the transverse partitions in the chambers it has one or more incisions 19 made in it.

The apparatus described works as follows:

The loose cartridges are shot into the receptacle 1 with their bases towards one side. The transverse partitions in the lower part of the receptacle effect a distribution of the loose cartridges in such a way that they are caused to lie in rows parallel with the direction of movement of the feeder. As the transverse partitions are of different heights the cartridges introduced into the receptacle cannot set themselves across two adjacent transverse partitions but fall freely to the bottom. They therefore lie correctly alongside one another on the bottom 2 of the receptacle 1.

If the magazine to be filled be now thrust into the orifice 16 and the feeder 5, 6 moves towards the opening 15, the cartridges in the lowermost row will be taken by the feeder 6 and transferred along the bottom 2 and through the opening 15 into the magazine 17.

By the pressure of the feeder 6 the transverse partitions 7, 8, 9 will be raised against the pressure of the spring 11. After the lowermost row has been ejected the feeder 6 is moved back, after which a fresh row of cartridges sinks down on to the bottom of the receptacle. At this stage the transverse partitions 7, 8, 9 return to their position of rest and engage the cartridges of the lowermost row in such a way that even if the filling apparatus be placed in an inclined position the cartridges cannot fall out of the filler itself.

In order to ensure the magazine 17 being completely filled the receptacle 1 is so arranged as to its shape in plan and the transverse partitions provided in such number that when the cartridges are piled in rows the number of cartridges lying in one row corresponds to a proper fraction of the total number of cartridges required to fill the magazine. Supposing for example that the magazine to be filled is intended to hold twenty cartridges, the shape of the receptacle and the transverse partitions will be so selected that for example four cartridges lie alongside each other in a row. In this way by depressing the feeder five times the whole magazine will be filled. By simply counting the rocking movements of the feeder it is possible to check when the magazine is filled.

In the constructional example shown in Figs. 4 to 6 of the apparatus, 1 is the receptacle for holding the cartridges, 2 the bottom of the receptacle, 3 the guiding edge for the feeder 6, which is mounted on a lever 5 adapted to oscillate on the pivot point 4. The piling device consists in the constructional example shown of transverse partitions 20, 21, 22, 23 which are so arranged in the receptacle that there is room for only one cartridge between each pair of partitions.

The partitions 20—23 are connected into a separate inserted member by connecting walls 24, 26. The chambers formed by the transverse partitions are, as shown in Fig. 4, arranged in stepped order in the vicinity of the bottoms or bases of the cartridges, so that the cartridges shot into the receptacle become piled in such a way that when they are transferred into the magazine each succeeding cartridge rests with its flange in front of the flange of the preceding cartridge on the outside thereof.

In the constructional example shown the connecting wall 24 is made stepped for this purpose. On this connecting wall 24 is also provided the spring 11 which passes through a slot 12 and the hook-shaped end 11' of which embraces the bead 13.

The construction otherwise of the present filling device is the same as that shown in Figs. 1 to 3 and similar parts are denoted by the same reference letters.

When shooting the cartridges into the receptacle they become piled in rows by the dividing walls 20–23 in such a way that only one cartridge lies between the walls.

By the formation of the connecting wall 24 in steps it is ensured that the cartridges piled in rows lie with their bases stepped or offset relatively to each other so that when they are ejected they rest, as is shown in Fig. 4, with their flanges on the outside of the preceding cartridge in each case.

The working of the present apparatus for filling magazine is otherwise the same as that shown in Figs. 1 to 3.

What I claim is:

1. Apparatus for feeding cartridges to the magazines of fire arms consisting of a receptacle for the cartridges, said receptacle being apertured in one side wall above the bottom of said receptacle so as to permit of the passage therethrough of a cartridge, a feeder adapted to be moved towards and away from said apertured wall, means for connecting said receptacle with a magazine to be filled, and means in the receptacle adapted to pile loose cartridges introduced into the receptacle in rows of superposed cartridges in such manner that when the feeder is moved towards the apertured side wall the cartridges in the lowermost row are transferred successively through the said apertured wall into the magazine.

2. Apparatus as claimed in claim 1, characterized by the fact that it comprises partitions arranged in the receptacle which subdivide the interior of the receptacle into chambers running substantially at right angles to the direction of movement of the feeder, said partition being so disposed that they are adapted to pile loose cartridges introduced into the receptacle into rows of superposed cartridges.

3. Apparatus as claimed in claim 1, characterized by the fact that it comprises partitions disposed substantially at right angles to the direction of movement of the feeder, arranged in the receptacle and subdividing it into chambers, the distance of the partitions from each other and from the walls of the receptacle being so calculated that there is room for at most two cartridges between each two partitions and between said partitions and the walls of the receptacle, in planes lying parallel with the direction of movement of the feeder.

4. Apparatus as claimed in claim 1, characterized by the fact that it comprises partitions of different height arranged in the receptacle which subdivide the interior of the receptacle into chambers running substantially at right angles to the direction of movement of the feeder, said partitions being so disposed that they are adapted to pile loose cartridges introduced into the receptacle into rows of superposed cartridges.

5. Apparatus as claimed in claim 1, characterized by the fact that the receptacle is provided with means adapted to pile loose cartridges introduced into the receptacle in rows of superposed cartridges, said means comprising partitions adapted to be movable vertically and a spring adapted to control said movement, and said partitions being spaced at their bottom edges from the bottom of the receptacle a distance less than that required for the passage of a cartridge.

6. Apparatus as claimed in claim 1, characterized by the fact that it comprises partitions arranged in the receptacle which subdivide the interior of the receptacle into chambers offset with regard to one another and running substantially at right angles to the direction of movement of the feeder, said partitions being so disposed that they are adapted to pile loose cartridges introduced into the receptacle into rows of superposed cartridges.

7. Apparatus as claimed in claim 1, characterized by the fact that it comprises partitions arranged in the receptacle which subdivide the interior of the receptacle into chambers running substantially at right angles to the direction of movement of the feeder, said partitions being connected together by end walls which constitute with the partitions a member wholly distinct from the receptacle and capable of insertion therein and removal therefrom.

8. Apparatus as claimed in claim 1, characterized by the fact that it comprises partitions arranged in the receptacle which subdivide the interior of the receptacle into chambers running substantially at right angles to the direction of movement of the feeder, said partitions being connected together by end walls, one of which is of stepped formation.

9. Apparatus as claimed in claim 1, characterized by the fact that it comprises partitions arranged in the receptacle which subdivide the interior of the receptacle into chambers running substantially at right angles to the direction of movement of the feeder, said partitions being connected together by end walls which constitute with the partitions a member wholly distinct from the receptacle and capable of insertion therein and removal therefrom, a spring holding device being mounted on the receptacle adapted to hold the partition member in place therein.

10. Apparatus as claimed in claim 1, characterized by the fact that it comprises partitions arranged in the receptacle which subdivide the interior of the receptacle into chambers running substantially at right angles to the direction of movement of the feeder, said partitions being connected together by end walls which constitute with the partitions a member wholly distinct from the receptacle and capable of insertion therein and removal therefrom, a spring holding device being mounted on the receptacle adapted to hold the partition member in place therein, and a projecting portion on the partition member with which said spring holding device is adapted to engage.

11. Apparatus as claimed in claim 1, characterized by the fact that it comprises partitions arranged in the receptacle which subdivide the interior of the receptacle into chambers running substantially at right angles to the direction of movement of the feeder, said partitions being so disposed that they are adapted to pile loose cartridges introduced into the receptacle into rows of superposed cartridges, wherein the dimensions of the chambers formed by said partitions are such that when the cartridges are piled and in rows the number of cartridges in a row is a simple fraction of the total number of cartridges which are required to fill the magazine.

In testimony whereof I affix my signature.

VÁCLAV HOLEK.